United States Patent [19]
Champan

[11] 4,009,354
[45] Feb. 22, 1977

[54] SIGNALLING DEVICE FOR KEY TELEPHONE SYSTEMS

[75] Inventor: Louis W. Champan, Kent, Wash.

[73] Assignee: Melco, Bellevue, Wash.

[22] Filed: Sept. 5, 1975

[21] Appl. No.: 610,853

[52] U.S. Cl. .......................... 179/99; 179/18 AD
[51] Int. Cl.[2] ........................................ H04M 1/72
[58] Field of Search ............... 179/1 H, 18 AD, 37, 179/99

[56] References Cited

UNITED STATES PATENTS

| | | | |
|---|---|---|---|
| 3,014,097 | 12/1961 | Apt | 179/84 R |
| 3,089,000 | 5/1963 | Burgener | 179/84 R |
| 3,668,331 | 6/1972 | Warner | 179/37 |
| 3,670,110 | 6/1972 | Warner | 179/18 AD |
| 3,725,594 | 4/1973 | Cartwright | 179/18 AD |
| 3,739,100 | 6/1973 | Cartwright | 179/18 AD |
| 3,941,944 | 3/1976 | McIntosh | 179/99 |

Primary Examiner—William C. Cooper
Assistant Examiner—Randall P. Myers
Attorney, Agent, or Firm—Sherman Levy

[57] ABSTRACT

The present invention relates to a device which is to be used in conjunction with key telephone systems, as for example, intercom systems. More particularly, the invention consists of a device for decoding the pulse output from rotary dial telephones, indicating which digit has been dialed and selectively signalling the called party. Special features include acceptance of a wide range of pulse speeds and ratios with decoding immunity to the initial hookswitch closure and the last opening. The latter permits the digit "1" to be used, providing for an additional signal function. A decoding matrix operates a relay tree with provisions for either single or two-digit codes. The device is intended for use in key telephone systems which include rotary dial telephones.

15 Claims, 5 Drawing Figures

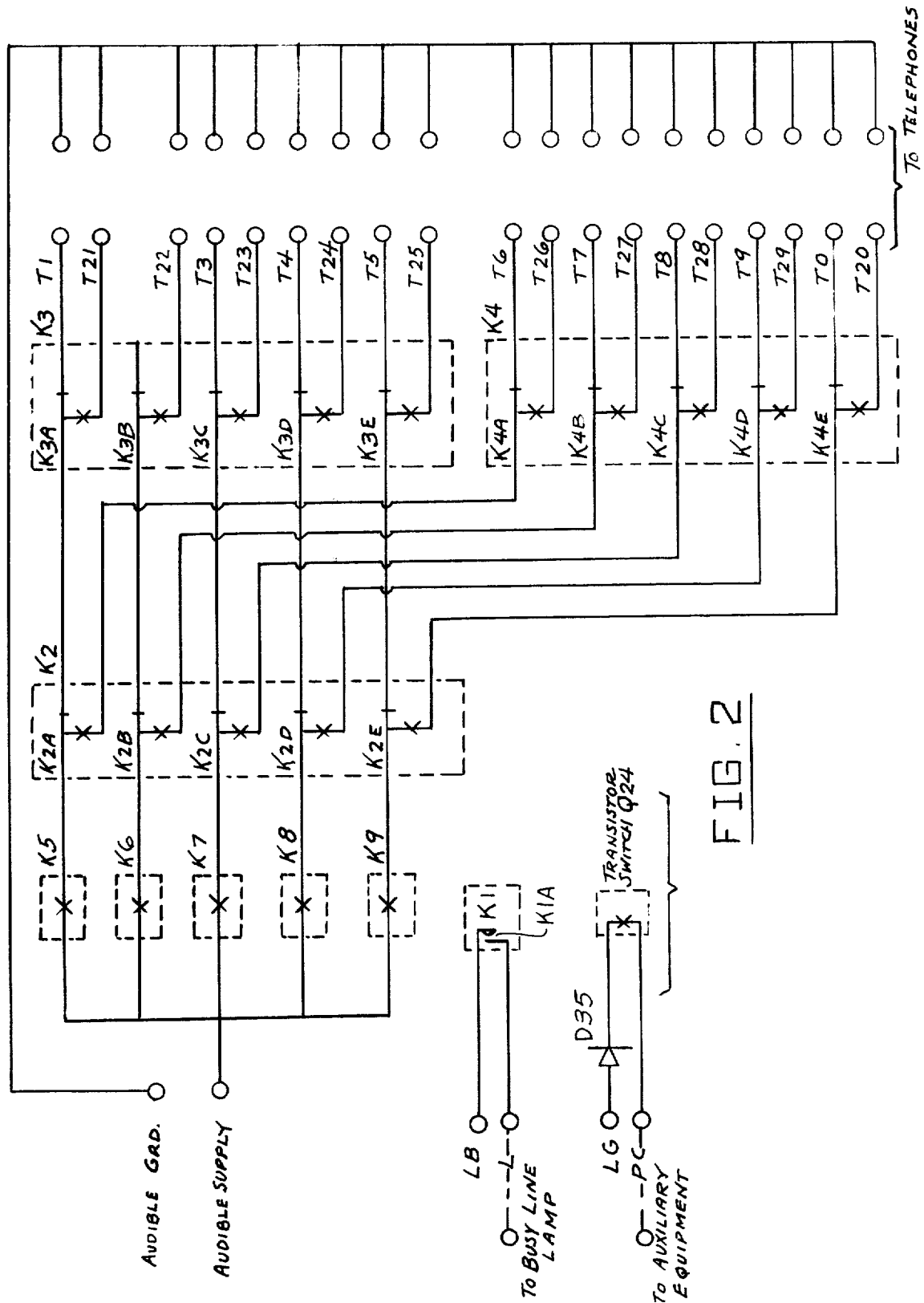

SIGNALLING DEVICE FOR KEY TELEPHONE SYSTEMS

BRIEF SUMMARY OF THE INVENTION

This invention is directed to an improved signal detection and calling device for use with key telephone systems, as for example, intercom systems.

The embodiment shown may utilize either single or two-digit codes, providing for a system of up to 19 stations.

BACKGROUND OF THE INVENTION

In recent years the field of telephony has been advanced through the use of solid state switching systems in which the signalling information is processed using integrated circuitry and computer technology.

An object of the present invention is to provide an improved signalling device for key telephone systems using CMOS (complementary-symmetry metal oxide semiconductor) digital detection which combines all counting and decoding functions in a single device. Another object of this invention is to provide an intercom signalling device which allows the connection of up to 19 intercom stations. Still another object of the invention is to provide an intercom signalling device which may utilize either single digit or two-digit codes. Still another object of the invention is to provide a device in which the calling signals can be repeated without the necessity of operating the switch hook on the telephone instrument. Yet another object of the invention is to provide a device which includes a one second signal contact closure whenever an intercom signal is detected. Yet another object of the invention is to provide a device which is so compact and self-contained that it may be installed in a fraction of the time and at less cost than prior art systems.

BRIEF DESCRIPTION OF THE SEVERAL VIEWS OF THE DRAWINGS

The above and other objects and advantages of the invention will become apparent upon full consideration of the following detailed description accompanying the drawings in which:

FIG. 2 is a schematic diagram of a relay tree including provision for either one or two-digit signalling.

GENERAL CIRCUIT OPERATIONAL FEATURES

Referring to FIGS. 1A to 1D, the circuit provides the line relay coil L1 (FIG. 1A) which provides talk battery to the telephone or telephones while using the intercom system.

Q1 (FIG. 11A) is used to detect the output pulses from a telephone which is dialing on the intercom line. When a telephone does come off the hook on the intercom line, Q1 senses the current flow in the line and operates the circuit consisting of Q2, which provides a relay contact closure output and a transistor switch closure output for the duration of time that the intercom line is in use.

When the telephone which has come off hook begins to dial, Q1 passes these dial pulses along to a circuit consisting of part of IC1 and part of IC2 (FIG. 1C), namely, IC1 (A), IC2 (A) and IC2 (B), which together form a pulse conditioning circuit, shown at 10.

The output of the conditioning circuit 10 drives a digital counter/decoder and a retriggerable one-shot circuit, shown at 11. At the conclusion of the pulsing, the decimal equivalent of the number of pulses dialed will be on the output of the digital counter/decoder IC3.

The output of the digital counter/decoder goes into a diode matrix and a sensing circuit. The enable signal, which is 1.0 second in duration, comes from the output of the retriggerable one-shot 11, which includes part of IC1 (FIG. 1C), is delayed to allow the sensing circuit to establish if a digit 2 or any digit from 6 to 0 has been decoded.

Figure 1A:
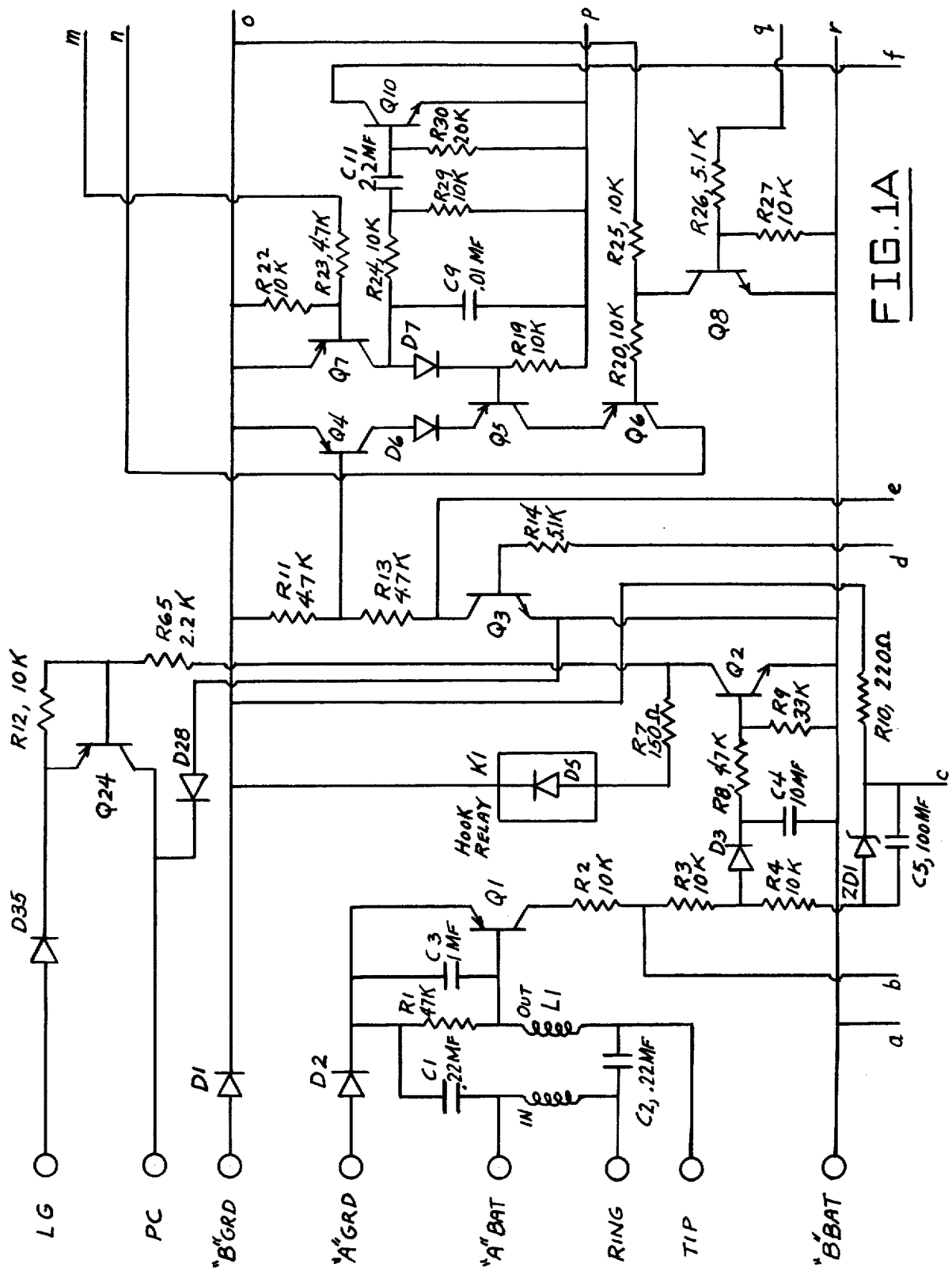
FIGS. 1A to 1D comprise, when taken together, a schematic diagram of a decoder including regulated power supply, time-out circuits, and a line feed relay according to a preferred embodiment of the present invention.
Figure 1B:
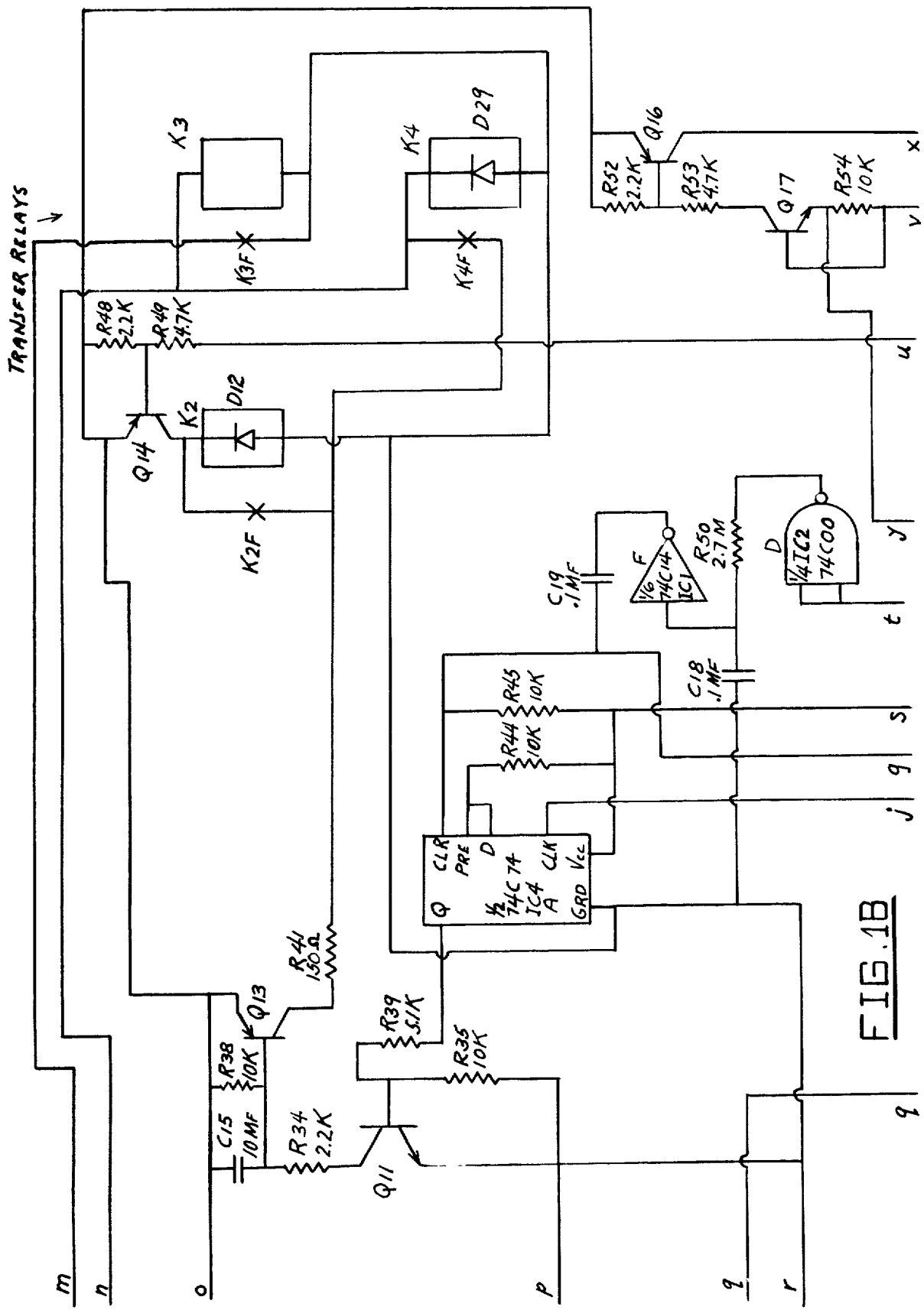
Figure 1C:
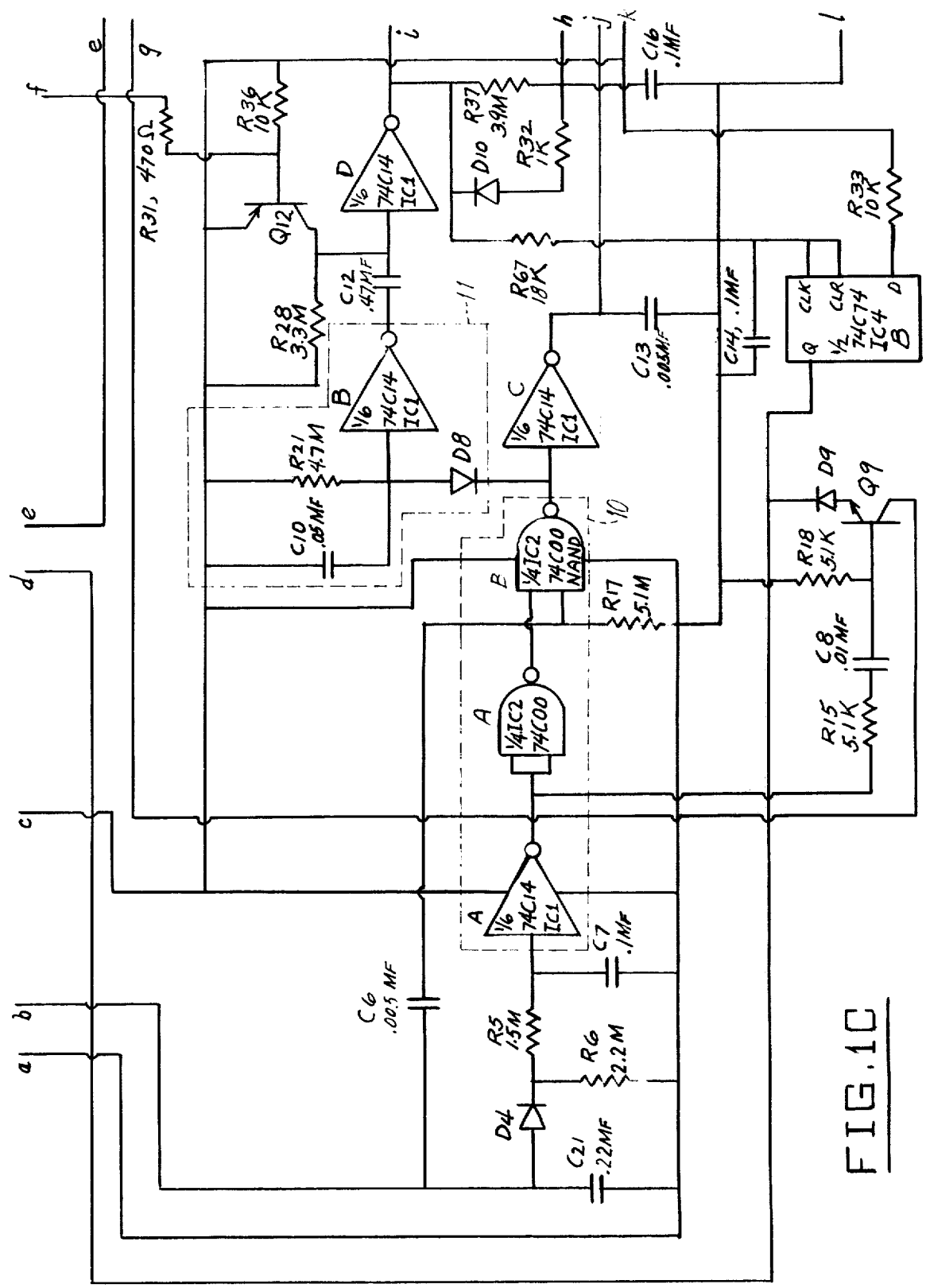

For instance, if a digit 2 was dialed, then relays K3 and K4 (FIG. 1B) would pull in and latch through latching circuit Q11, Q13, and ½ of IC4. Also, upon K3 and K4 latching, a reset pulse would be generated by the circuit Q7, Q10 and Q12 (FIGS. 1A and 1C). This reset pulse would reset the retriggerable one-shot's output pulse, which in turn would reset the digital counter/decoder.

Now the circuit is reset and ready to accept another sequence of dial pulses from Q1. With the application of another sequence of dial pulses the same procedure would be followed as described before. Again, the decimal equivalent of the number of pulses appears at the output of the digital counter/decoder.

Again the enable signal is delayed to allow sensing circuits to establish if a digit 2 or any digit between 6 and 0 has been decoded. Since the first digit dialed was a digit 2, the sensing circuit for digit 2 detect is inhibited by Q7 and Q5 (FIG. 1A). So the only sensing circuit which is active is the sensing for a digit from 6 to 0. In the case where the second digit is a digit from 6 to 0, it will be sensed and relay K2 will pull in and latch through Q11, Q13 and ½ of IC4 (FIG. 1B).

Figure 1D:
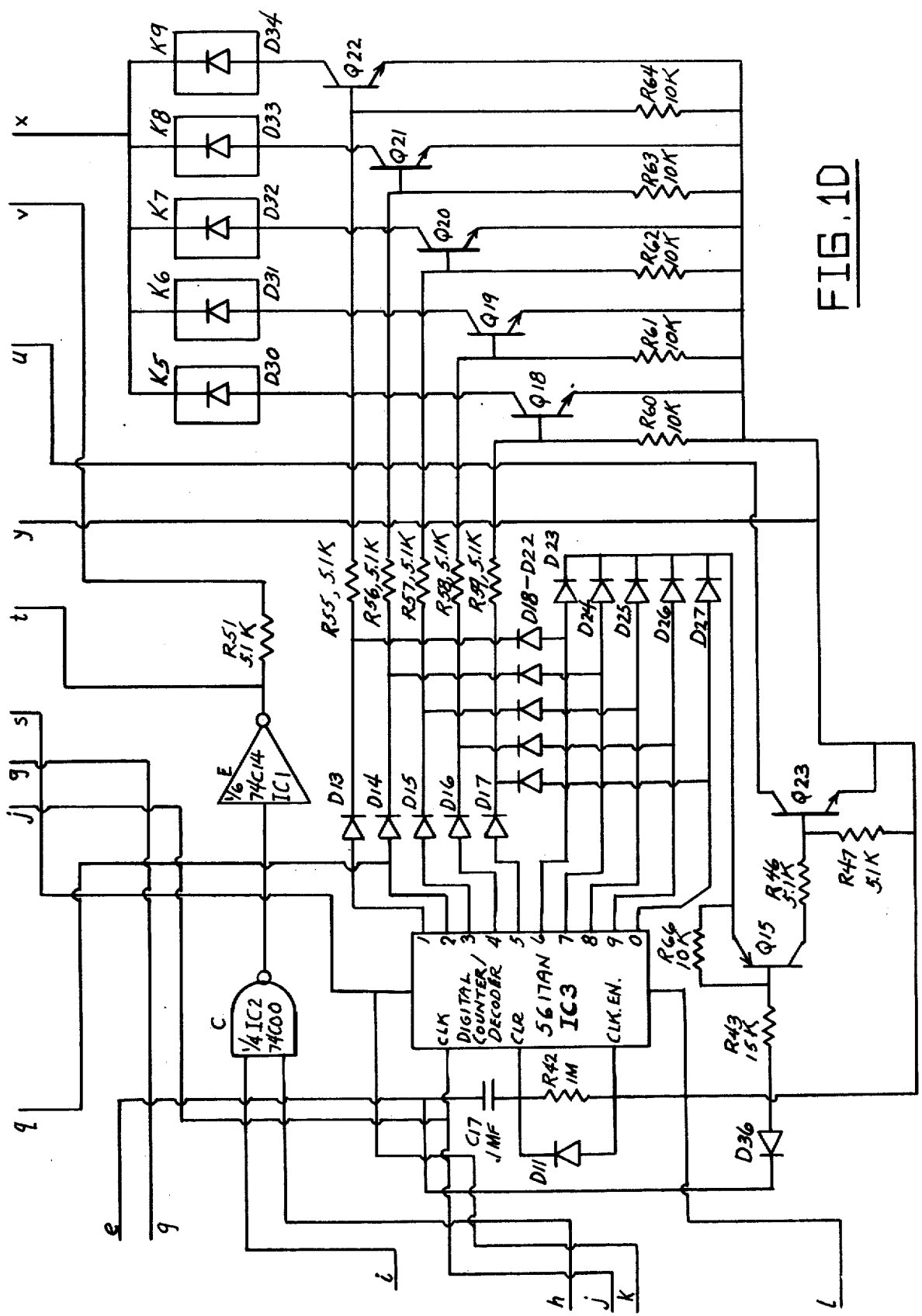

No reset pulse is generated by the latching of K2. Therefore at the end of the delay period, which is approximately 20 msec, the enable signal is applied to Q17 and Q16 (FIG. 1B). Q16, when enabled, provides the operating voltage for relays K5 through K9 (FIG. 1D).

Immediately upon Q16 turning on the appropriate relay from K5 to K9 will pull in, depending upon which relay has been selected by the diode matrix. When one of these relays does pull in, the signalling voltage is applied to the appropriate telephone, through the contacts of that relay and the contacts of K2 and either K3 or K4.

Upon termination of the enable signal, Q16 turns off first, which allows whichever relay was pulled in, from either K5 to K9, to release. A time delay is provided for by R50 and C18 (FIG. 1B) to delay the trailing edge of the enable signal from resetting the transfer relays K3, K4 and relay K2. Now the circuit is back to its original quiescent state and is ready to accept another series of dial pulses in the case where the same number wants to be redialed or a different number is dialed. It can be seen that due to the delay of the enable pulse it always allows the transfer relays K2 or K3 and K4 to operate (dry). That is, at the time they operate and release there is no current flowing through their contacts. The advantage of this is that it is not necessary to protect their contacts against arcing which results from high inductive loads, such as buzzers and bells used inside telephones. In this way the contacts of K5 through K9 are the only ones which have to possess high current capabilities.

Q9 and ½ of IC4 (FIG. 1C) act together to generate a reset pulse to reset K3 and K4 in the event that a digit 2 (transfer digit) is dialed as the first digit and then the telephone which is initiating the call hangs up.

DETAILED CIRCUIT OPERATION

This device includes provision for supplying talking battery voltage for the telephone instruments connected to the system.

Referring to FIG. 1A, L1 is a line feed coil. The IN side of the first winding is connected to A battery, and the OUT side of the other winding is connected to A ground. The other side of each winding is connected to ring and tip respectively. With a connection such as this, the A ground and the A battery supply has a high source of impedance. C2 serves to bring L1 into resonance at lower frequencies.

A self-contained power supply is included in the device to regulate the supply voltage into the CMOS (complementary-symmetry metal oxide semiconductor) digital integrated circuits used. This is required since the device is designed to operate from telephone systems in which the supply voltage is of the order of 18–28 volts D.C. specified for common telephone key system equipment. Zener diode ZD1, resistor R10 and capacitor C5 (FIG. 1A) comprise the voltage regulator used. ZD1 maintains 12 volts D.C. ± 10% to the power connections of all IC devices used, namely, IC1, IC2, IC3 and IC4. Capacitor C5 provides sufficient filtering of the A.C. component of the regulated D.C.

The signalling system utilized with rotary dial type telephone instruments is common knowledge in the telephone industry. It consists of a sequentially opening and closing contact which is in series with the line circuit. This series of openings and closings forms dial pulses. A sequence of these pulses relate to the number dialed, for instance: dialing a digit 1 causes the dial contacts to open and close once, dialing a digit 2 causes the dial contacts to open, close, open and close again, and thus a sequence of two dial pulses corresponds to a digit 2 being dialed. This type of sequence occurs relative to the digit dialed. The digit 0 causes 10 dial pulses to be sequenced. A sequence of dial pulses has a certain repetition rate associated with them and a certain duty cycle.

The tip and ring connections are common to all telephone instruments operating on the intercom system which this device provides.

When a telephone instrument is off hook on the intercom line, there is an effective 150 OHMS loop across the tip and ring connections. This condition causes current to flow from A battery through one winding of L1 out the ring terminal through the other winding of L1, through R1, through D2 and back to the other side of the supply A ground.

When a sufficient current flows within the loop to develop approximately 0.75 volts across R1, the base emitter junction of Q1 becomes forward biased, and Q1 turns on, conducting current from A ground down through the network R2, R3, and R4.

With Q1 conducting, capacitor C4 charges through D3, and also, Q2 turns on, causing relay K1 (FIG. 1A) to pull in. With Q2 now conducting, Q24 is turned on. The relay contacts (K1A) of K1 serve the purpose of operating the intercom button lights through K1A and L (FIG. 2) on all telephone instruments in the system to signify that the system is in use. Q24 (FIG. 1A) provides a latching ground through PC (FIG. 2) for auxiliary equipment.

The time constant associated with C4, R8 and R9 (FIG. 1A) provides the current to keep Q2 and Q24 conducting while Q1 is turning on and off following dial pulses. When the loop across tip and ring opens and remains open for a time period that exceeds the time constant of C4, R8 and R9, then Q2 will stop conducting, K1 will release and Q24 will turn off. This action will cause the intercom busy lamp button on each telephone instrument to go out, signifying that the system is not in use.

As described, Q1 detects on hook and off hook conditions, as well as detects dial pulses. As described above, assuming an off hook condition has been detected, Q1 turns on, causing Q2 and Q24 to turn on. To illustrate how this device prevents a digit 1 from being detected upon coming off hook with an instrument, refer to the pulse conditioning circuit 10 consisting of IC1 (A) and IC2 (A) and (B) (FIG. 1C). With Q1 turned on, a positive potential is applied to the junction of C6, D4 and C21 (FIG. 1C). The time constant of R2 (FIG. 1A) and C21 (FIG. 1C) prevents any hook switch bounce from being passed through the pulse conditioning as valid dial pulses. If Q1 conducts long enough, 10 milliseconds, then C7 starts to charge through D4 and R5, and also a positive differentiated pulse is coupled through C6 to one input of the NAND gate IC2 (B), which is only 5 milliseconds in width, and the other input is held low until C7 charges to the threshold voltage of IC1 (A), and the output of IC2 (B) remains high (12 V.). When C7 does charge to the threshold voltage of IC1 (A), the output of IC1 (A) switches low, and this level is inverted by IC2 (A) and applies a high level (12 V.) to the other input of NAND gate IC2 (B). It takes a high level signal at both inputs to NAND gate IC2 (B) for its output to go low. It takes approximately 200 milliseconds for C7 to charge to this threshold voltage, consequently the first pulse coupled by C6 to one input of NAND gate IC2 (B) arrives there before the other input of IC2 (B) goes high, and consequently the output from IC2 (B) remains high. In this way the device is made immune to hook switch bounce upon coming off hook and the transition to an off hook condition.

When going back on hook, again the pulse conditioning circuit prevents a digit 1 from being dialed. When the telephone instrument is placed back on hook, the positive potential is removed from the junction of C21, D4 and C6. This causes a negative-going differentiated pulse to be coupled through C6, which is of the wrong polarity to cause NAND gate IC2 (B)'s output to change, hence no digit will be detected.

Continuing on with the sequence of events after initially coming off hook, it has already been described that Q1 turns on along with Q2 and Q24, and 200 milliseconds later IC2 (B) is enabled and the device is now ready to accept dial pulses.

With the dialing of a number on the telephone which is off hook, a series of opening and closing actuations of the loop are made. Q1 detects these openings and closings of the loop (dial pulses) and turns on when the loop is closed and turns off when the loop is opened, thereby presenting a series of positive pulses to the pulse conditioning circuit. With IC2 (B) being enabled now, each positive pulse coupled to the other input of IC2 (B) causes its output to go low for the duration of time that the pulse is present, approximately 5 milliseconds.

The first negative pulse from the output of IC2 (B) is coupled through D8 to the input of IC1 (B) (FIG. 1C) and the time constant network C10 and R21, which combine to make the retriggerable one-shot 11 which serves as an interdigit timer. This negative pulse discharges C10 and holds the input to IC1 (B) low, causing its output to go high. If C10 does not continue to be discharged every 100 milliseconds, it will charge positively to the threshold voltage of IC1 (B), causing its output to switch negative.

The negative pulses coming from the output of IC2 (B) are used to hold C10 discharged and the output of IC1 (B) high. These pulses are also inverted by IC1 (C) and applied to the clock inputs of both the digital counter/decoder and IC4 (A) (FIG. 1B). By applying these pulses to the clock input of IC4 (A) the Q output will switch to a high level. This will enable Q11 (FIG. 1B) which will cause Q13 to be turned on, presenting a latching ground to the normally open contacts K2F, K3F and K4F of relays K2, K3 and K4. The digital counter/decoder IC3 (FIG. 1D) advances on the positive-going edge of each pulse. The pulses are counted and appear on the output of IC3 in a 1 to 10 format. Since the outputs of IC3 are continually changing as long as the input is receiving pulses, the output of the diode matrix, which decodes the output of IC3, is delayed from being enabled until pulsing has stopped.

With the cessation of pulsing, C10 (FIG. 1C) is allowed to start charging through R21 to the threshold voltage of IC1 (B). Upon C10 reaching the threshold voltage, the output of the IC1 (B) switches negative. This negative excursion discharges C12 to zero volts, which causes the input to IC1 (D) to go to zero volts and its output to go high (+12 V.). C12 immediately starts charging back to +12 V. through R28. The network of R28, C12 and IC1 (D) (FIG. 1C) makes up the output timer, which controls how long the output relays of this device stay pulled in, delivering an audible supply current to the telephone selected.

Upon the output of IC1 (D) going positive, it is delayed from enabling the ouput relays by the time constant of R37 and C16 (FIG. 1C). This time constant is approximately 20 milliseconds. This time delay is provided so that outputs 6 through 0, and also output 2 of IC3 (FIG. 1D) can be interrogated for the presence of a high level (+12 V), signifying that that particular digit had been dialed. Since the outputs of IC3 are decimal, one and only one output will be high at a given time.

Also, the positive-going output of IC1 (D) (FIG. 1C), which is the leading edge of the enable pulse, is fed into the clock and clear inputs of IC4 (B) (FIG. 1C), which causes the Q output to go high, turning on Q3 (FIG. 1A). When Q3 turns on it forward-biases Q4 and enables Q15 (FIG. 1D). With Q4 conducting, a positive potential is placed on the emitter of Q6 (FIG. 1A) through diode D6 and normally turned on transistor Q5.

Assuming that output 2 of IC3 was high, it would signify that a digit 2 had been dialed, which is permanently assigned as the transfer digit for a two-digit intercom number. With the output 2 of IC3 high, Q8 (FIG. 1A) will turn on, hence causing Q6 to now conduct and apply the pull-in voltage for relays K3 and K4 (FIG. 1B). Both relay K3 and K4, upon pulling in, will latch up via contact K4F of relay K4 and transistor Q13. Contact K3F of relay K3 is normally open, with one side of it connected to B battery while the other side connects to the base of Q7 (FIG. 1A). When relays K3 and K4 pull in, contact K3F closes, placing B battery on the base of Q7. This bias on the base turns Q7 on, applying a positive potential through diode D7 to the base of Q5 which causes it to be held turned off, which removes the forward bias from the emitter of Q6, causing it to be held off. Also, when Q7 turns on, this positive potential is coupled to the base of Q10 (FIG. 1A) through C11. Q10 is driven into conduction by this pulse and by this action pulls the base of Q12 (FIG. 1C) low, which turns it on. The pulse passed by C11 is only a few milliseconds in width. Consequently, Q10 and Q12 are only conducting for a few milliseconds.

When Q12 turns on it effectively shorts the resistor R28. This action causes C12 to charge back up to the threshold voltage of IC1 (D) very rapidly. Consequently, the output from IC1 (D) returns to a low level before the time constant of R37 and C16 (FIG. 1C) has had time (approximately 20 milliseconds) to charge up to the threshold voltage of IC2 (C) (FIG. 1D), which when enabled by this signal would have passed the enable pulse out to pull in the signalling relays.

With the output of IC1 (D) (FIG. 1C) going back to a low level, IC4 (B) (FIG. 1C) is cleared, thereby turning Q3 (FIG. 1A) off. When Q3 turns off its collector goes back high, in this case (GRD), which disables Q15 (FIG. 1D) and also couples a positive pulse via C17 to the clear input of IC3. The clear pulse to IC3 resets all outputs to a low level, except for digit 0 output which is normally high, until the input to IC3 receives its first pulse.

With the conclusion of the reset pulse, the retriggerable one-shot 11, the output timer R28, C12, IC1 (D) and the counting/decoding circuitry IC3 are all reset, awaiting the next digit of the two-digit number to be dialed. With the next digit dialed the same sequence of events takes place except for the pulse that resets the output timer. When the dial pulses stop again, the decimal equivalent of the number of dial pulses are present at the output of IC3. Also, again the enable pulse is delayed to allow the sensing circuit for a digit from 6 to 0 to be detected. The sensing circuit for digit 2 is disabled now because the digit 2 was detected as the first digit dialed. Consequently, its sensing circuit is disabled.

Assume that the second digit was a digit 6. Then, the decimal output 6 of IC3 will be high and applied through D23 to the emitter of Q15 (FIG. 1D). Q15, being enabled from Q3, will now turn on, causing Q23 to turn on, which causes Q14 (FIG. 1B) to turn on. When Q14 turns on, relay K2 pulls in. Relay K2, upon pulling in, will latch up through its own contact K2F and Q13. At the end of the time delay period, the enable signal is gated through IC2 (C) (FIG. 1D) and is inverted by IC1 (E). The enable signal is now a positive signal which turns on Q17 (FIG. 1B), and by Q17 turning on Q16 is turned on. The operating voltage for relays K5 through K9 (FIG. 1D) is now applied to one side of the relay coils of K5 through K9. The high level output from the IC3 on decimal output 6 is applied through D22 and R55 to the base of Q22 (FIG. 1D) throughout this delay period, but now that Q16 (FIG. 1B) has turned on and applied the operating voltage, Q22 will immediately turn on, pulling in K9.

Referring to FIG. 2, relays K5 to K9 are single form A contact relays. One side of all these contact sets are commoned together and connect to the audible supply.

Now, as the contacts of relay K9 close, the audible supply is routed through these contacts and on to contacts K2E of relay K2. Since K2 (FIG. 1B) is pulled in, the audible supply voltage is routed through the normally open contacts and on to contacts K4E of relay K4. K4 (FIG. 1B) is also pulled in so the audible supply voltage is routed through the normally open contacts and out to terminal T20. Terminal T20 goes to the telephone instrument assigned to the corresponding number in the intercom system. When the audible supply voltage reaches the telephone, the audible device within the telephone will sound until the audible supply voltage is removed.

At the end of the time out period the output of the timer R28, C12, IC1 (D) goes low, thereby removing the forward bias from Q17 (FIG. 1B), which turns Q16 off, removing the operating voltage from K5 to K9, which allows whichever relay was pulled in to release. The contacts of K5 through K9 will always open the circuit to the audible device within the telephone while current is still flowing. Relays K2, K3 and K4 are still operated at this time. Consequently, the contacts of relays K5 to K9 have to have a high current-handling capability while all of the other relays do not, due to the fact that they always operate while there is current flowing in the circuit.

In addition to turning Q17 off, the trailing edge of the time-out period (enable pulse) places a low on the clear input to IC4 (B) (FIG. 1C), clearing it. When IC4 (B) is cleared, its Q output goes low, which turns off Q3 (FIG. 1A). When Q3 turns off it causes a positive pulse to be coupled through C17 to the clear input of IC3 (FIG. 1D). This causes the outputs of IC3 to go to zero voltage, except for output 0, which is cleared to a high level, logic one. At the same time that IC3 is cleared, diode D11 is back biased, removing the enable drive from the base of Q15 (FIG. 1D). Also, with Q3 turning off, Q4's base is allowed to be pulled back to the emitter of Q4 through R11, turning Q4 off. With Q4 turned off the forward bias from Q5's emitter is removed.

In addition to turning Q17 (FIG. 1B) off, the low level at the output of IC1 (E) (FIG. 1D) is inverted by IC2 (D) (Fig. 1B) and applied to the charging circuit of R50 and C18. When C18 charges to the positive threshold voltage of IC1 (F) (FIG. 1B), the output of IC1 (F) switches negative (logic zero), thereby coupling a negative spike through C19 to the clear input of IC4 (A). Upon IC4 being cleared, the Q output switches low, turning Q11 off. When Q11 turns off the forward bias is removed from Q13, causing it to turn off. When Q13 turns off it removes the locking ground path for relays K2, K3 and K4. Consequently, whichever ones were pulled-in can now release. It can be seen that relays K2, K3 and K4 release a definite delayed period after the release of relays K5 through K9.

The purpose of Q9 (FIG. 1C) is to clear IC4 (A) when the first digit of a two-digit number is dialed; then the calling party goes back on hook. This action occurs due to the fact that when the calling party does go on hook after dialing a digit 2, the output of IC1 (D) (FIG. 1C) is still low, holding IC4 (B) in the clear mode, with Q low. With Q being low a negative potential is applied to the emitter of Q9. Capacitor C7 (FIG. 1C) starts discharging and when it reaches the threshold voltage of IC1 (A) the output of IC1 (A) switches positive. C8 couples a positive pulse to the base of Q9, causing it to turn off briefly, pulling the clear input of IC4 (A) (FIG. 1B) to B battery (low level), thereby causing the Q output to switch low, which disables Q11 and Q13 (FIG. 1B), which removes the latching ground for relays K2, K3 and K4, thereby releasing relays K3 and K4 which would have been pulled in if the digit 2 had been dialed.

While a specific embodiment of an improved signalling device for key telephone systems has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a key telephone intercom circuit for operating with up to 19 stations, a calling system having a hook switch-controlled loop with keying means at a calling station to open and close the loop to generate a sequence of pulses, means to sense the closing of the loop when a calling telephone is placed off hook, pulse conditioning circuit means, means to pass the sequence of pulses to said pulse conditioning means, digital counter and decoding means connected to the output of said pulse conditioning circuit means and generating decoded decimal outputs in accordance with the numbers of sequential pulses, diode matrix means connected to the outputs of said counter and decoding means, means connected to said diode matrix means to sense said decoded decimal outputs, relay tree means connected to said diode matrix means through said last-named sensing means and having respective branches connected to indicators at the telephones of the system, and means to selectively energize the indicators in accordance with the activation of said relay tree means.

2. The calling system of claim 1, and "busy line" indicating means connected to said telephones, and means to activate said "busy line" indicating means responsive to the operation of said loop closure-sensing means.

3. The calling system of claim 2, and wherein said "busy line" activating means comprises a transistor controlled by said loop closure sensing means and a relay controlled by said transistor.

4. The calling system of claim 1, and retriggerable one-shot circuit means driven by said pulse conditioning circuit means and generating a timed enable signal, means to apply said enable signal to said decoded decimal output sensing means, means to delay the transmission of said enable signal to said digital output sensing means, and means to activate said relay tree means when said enable signal is applied to said decoded decimal output sensing means.

5. The calling system of claim 4, and means to reset said retriggerable one-shot circuit means and said digital counter and decoding means responsive to the reception of a sequence of pulses corresponding to the digit 2.

6. The calling system of claim 4, and wherein said relay tree means includes transfer relay means for shifting from one-digit to two-digit operation, means to energize said transfer relay means responsive to reception of a sequence of pulses corresponding to the digit 2, means to generate a reset pulse responsive to the energization of said transfer relay means, means to apply said reset pulse to said retriggerable one-shot circuit means to reset same, and means to reset said digital counter and decoding means when the retriggerable one-shot circuit means resets.

7. The calling system of claim 6, and wherein said relay tree means includes further relay means to sense a digit from 6 to 0.

8. The calling system of claim 7, and means to delay the release of said transfer relay means and said further relay means upon termination of said timed enable signal.

9. The calling system of claim 7, and means to release said transfer relay means in the event that pulses corresponding to the digit 2 are received followed by the hanging up of the calling telephone.

10. The calling system of claim 1, and retriggerable one-shot circuit means driven by said pulse conditioning circuit means and generating a timed enable signal, means to apply said enable signal to said digital output sensing means, means to delay the transmission of said enable signal to said digital output sensing means, and means to activate said relay tree means when said enable signal is applied to said digital output sensing means, wherein said relay tree means includes transfer relay means for shifting from one-digit to two-digit operation, means to energize said transfer relay means responsive to the reception of a sequence of pulses corresponding to the digit 2, means to generate a reset pulse responsive to energization of said transfer relay means, means to apply said reset pulse to said retriggerable one-shot circuit means to reset same, means to reset said digital counter and decoding means when said retriggerable one-shot circuit means resets, interdigit timer means in said pulse conditioning circuit means, means to activate said interdigit timer means responsive to the reception of sequential pulses by said pulse conditioning circuit means, and means providing a latching ground for said transfer relay means responsive to the operation of said interdigit timer means.

11. The calling system of claim 10, and means to advance the digital counter and decoding means responsive to the reception of said last-named sequential pulses and place the pulse count on the output of said counter and decoding means in a 1 to 10 format.

12. The calling system of claim 11, and output timer means between the pulse conditioning circuit means and the relay tree means controlling the length of energization of the relay tree means.

13. The calling system of claim 1, and an audible signal current supply terminal, and wherein said relay tree means includes transfer relay means for shifting from one-digit to two-digit operation, further relay means to sense a digit from 6 to 0, and respective single-contact branch circuit relays whose contacts are connected between said audible signal current supply terminal and the contacts of said further relay means, means to energize said transfer relay means responsive to reception of a sequence of pulses corresponding to the digit 2, wherein the relay tree means has output terminals connected to the contacts of said transfer relay means, means to delay energization of said single-contact branch circuit relays until the further relay means and the transfer relay means have closed their contacts, and means to delay deenergization of said further relay means and said transfer relay means until after said single-contact branch circuit relays have become deenergized.

14. The calling system of claim 1. and means providing a time delay between the operation of said loop-closure-sensing means and said pulse conditioning circuit means when the calling telephone goes off hook to prevent a digit 1 from being falsely detected.

15. The calling system of claim 14, and means to generate an inhibiting signal between the loop closure-sensing means and said pulse conditioning circuit means when the calling telephone goes back on hook which inhibits operation of said pulse conditioning circuit means to further prevent false digit detection.

* * * * *